United States Patent [19]

Smith

[11] 4,391,100
[45] Jul. 5, 1983

[54] CLOSED LOOP HERMETICALLY SEALED SOLAR POWER GENERATOR

[76] Inventor: Derrick A. Smith, 1180 S. Seabreeze Blvd., Fort Lauderdale, Fla. 33316

[21] Appl. No.: 70,327

[22] Filed: Aug. 27, 1979

[51] Int. Cl.$^3$ .............................................. F03G 7/02
[52] U.S. Cl. .............................. 60/641.11; 60/641.15; 60/675; 60/693; 126/440
[58] Field of Search ................. 60/398, 641, 675, 693, 60/641.8, 641.11, 641.15; 202/234; 203/DIG. 1, DIG. 20; 126/438, 440, 441

[56] References Cited

U.S. PATENT DOCUMENTS

| | | | |
|---|---|---|---|
| 1,101,000 | 6/1914 | Willsie | 60/641 |
| 1,951,403 | 3/1934 | Goddard | 60/641 |
| 2,636,129 | 4/1953 | Agnew | 203/DIG. 1 |
| 3,338,797 | 8/1967 | Hermansen et al. | 202/234 |
| 3,414,481 | 12/1968 | Kelly, Jr. | 202/234 |
| 3,945,218 | 3/1976 | Parker | 60/641 X |
| 3,998,206 | 12/1976 | Jahn | 60/641 X |
| 4,010,378 | 3/1977 | Tharpe et al. | 60/693 X |
| 4,166,769 | 9/1979 | Dukess | 126/440 X |
| 4,187,686 | 2/1980 | Pommier | 60/641 X |
| 4,192,145 | 3/1980 | Tanaka | 60/675 |
| 4,244,189 | 1/1981 | Bliamptis | 60/641.11 |

Primary Examiner—Allen M. Ostrager
Assistant Examiner—Stephen F. Husar

[57] ABSTRACT

A closed loop sealed recirculatory water conservation solar power generator is provided herein. It includes a stationary hollow globular water boiler having a water inlet, a steam outlet conduit and a refractor lens window. A parabaterol reflector directs the sun's rays towards the refractor lens window to generate heat to boil the water. A primary steam-powered turbine is connected to the steam outlet conduit and is joined via a steam condensing radiator and a condenser to provide a water outlet which feeds a closed reservoir. A secondary water-powered turbine is provided for the generation of electricity and is connected to the reservoir in such a way that it is selectively driven by water from the reservoir. A valve automatically sequenced for periodic opening is provided, to permit flow of water from the reservoir to the secondary turbine to drive the turbine, and for periodic closing to cut off the flow of water to permit the secondary turbine to remain at rest. The effluent conduit feeds water back to the globular boiler. Finally, a check valve is provided in the effluent conduit to control the recirculating flow of water back to the globular boiler. Such solar power generator is thus very energy efficient and ecologically conservative since the water is returned to its original source when its work has been extracted.

1 Claim, 1 Drawing Figure

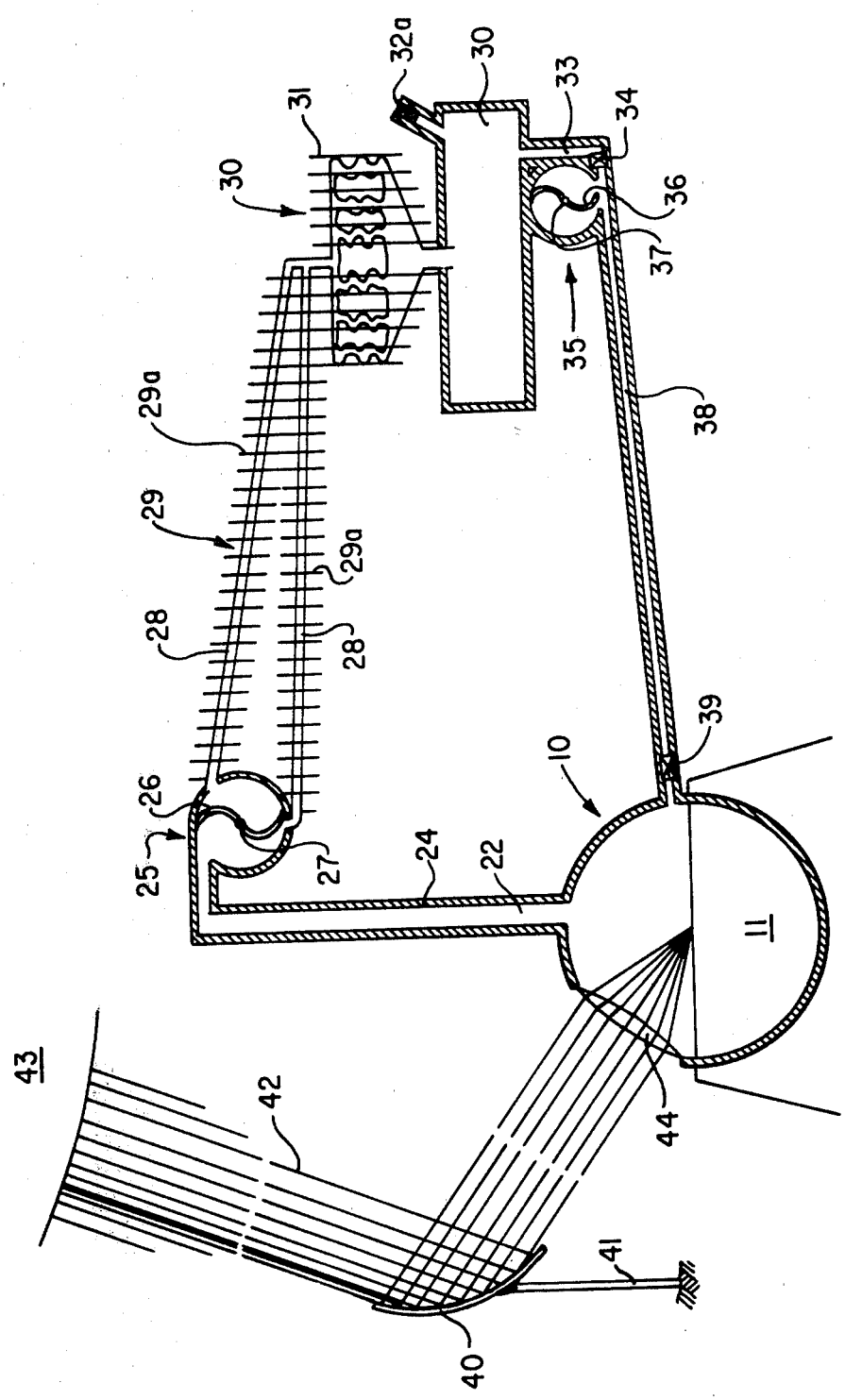

CLOSED LOOP HERMETICALLY SEALED SOLAR POWER GENERATOR

BACKGROUND OF THE INVENTION (i) Field of the Invention

This invention relates to a solar power generator apparatus for harnessing energy from the sun and for conserving the water so used by such apparatus.

(ii) Related Application

This invention is related to applicant's copending U.S. application Ser. No. 070,329 filed Aug. 27, 1979 (now U.S. Pat. No. 4,253,307).

(iii) Description of the Prior Art

Electricity is one of the most widely used forms of energy. It is known that electricity may be produced by hydroelectric generators, combustion engines powered by expensive fuel, e.g. oil or natural gas, or by electromotive steam engines powered by coal, or by the use of nuclear energy. These procedures suffer the deficiency that they may use dimenishing non-renewable resources, and of pollution of the environment.

It would be therefore be advantageous if electricity could be produced with the advantages pointed out above but with fewer of the aforementioned disadvantages while conserving the water used in the production thereof.

Many proposals have been made to achieve these ends. In one proposal, that provided by Canadian Pat. No. 145,581 issued Jan. 28, 1913 to R. A. Fessenden, apparatus was provided for obtaining power from the sun's radiant energy, which included the combination of a reservoir and a working fluid therein exposed to be heated by the sun's radiant energy, means for protecting such fluid against loss of heat by convection, a low pressure turbine and means to operate it by that fluid, and an upper fluid reservoir and a lower fluid reservoir combined to store energy generated by the turbine. The problem which that inventor apparently desired to solve was that of protection of the working fluid against heat loss by convection.

In another system, that provided by Canadian Pat. No. 505,536 issued Sept. 7, 1954 to Agnew, the patentee attempted to provide improved apparatus that utilized the energy of solar rays for effecting a temperature differential between a quantity of water or other liquid and the atmosphere thereabove, to conduct the resultant vapors to a higher level, and then to condense the vapors and store the liquid thus provided. The vapors created power to generate electric current. A heat exchange was effected between a source of water supply and a quantity of the water obtained from the supply to increase vaporization of the quantity of water. This was apparently solved by a solar engine including the combination of a reservoir, a basin for receiving liquid from the reservoir, a differential-pressure conduit extending from the reservoir to the basin for passing liquid into the latter, a transparent dome for the basin (comprising a plurality of flat sheets for transmitting solar rays to evaporate the liquid in the basin), a closed-circuit thermo-siphon heat exchanger extending from the reservoir and into the liquid in the basin for increasing the evaporative rate of the liquid, an upwardly directed duct extending from the dome to conduct the evaporated liquid to a level above, and at a substantially lower atmospheric pressure, than that of both the reservoir and the basin, a condenser at the upper end of the duct to condense the vapors, means for removing free air from the condenser, a storage reservoir elevated above the first-mentioned reservoir, and a differential-pressure conduit leading from the condenser to the storage reservoir. The problem apparently to be solved by this patentee was to avoid the detrimental effect on the heat exchange characteristics of the presence of free air in the condenser circuit.

In a third system, that provided by Canadian Pat. No. 669,504 issued Aug. 27, 1963 to Podolny, the patentee desired to provide an arrangement for storing some of the heat energy from the sun so that it might be utilized during the intervals when the device was not exposed to the radiant heat of the sun; and also to provide a powerplant in which a chemical compound was used which could be separated into its constituents electrically, together with an arrangement for storing the constituents, to be later combined chemically for producing electrical energy for the powerplant. These ends were apparently met by a solar energy powerplant including the combination of a boiler, a mirror for concentrating radiant heat on the boiler, a turbine powered by vapor under pressure from the boiler, and a generator driven by the turbine in combination with an electrolysis device for separating a compound into its constituents, storage means for the constituents, a fuel cell in which the constituents are combined to produce electrical energy, and control means for selectively connecting the generator to the electrolysis device and to a load or connecting the fuel cell to the load. The problem thus apparently solved by this patentee was to store the sun's energy in the form of constituents of a chemical which could later be recombined to provide electrical energy.

SUMMARY OF THE INVENTION (i) Aims of the Invention

It is seen therefore that the primary object of providing generation of electrical energy both in the daytime and at night while conserving the water used in the generation thereof has not yet been solved. However, by the present invention, this can be achieved by using a primary energy supply which is inexpensive, limitless and pure, namely the sun, in conjunction with the particular construction to be described hereinafter.

Thus, by this invention, a closed loop sealed recirculatory water conservation solar power generator is provided comprising: (a) a stationary hollow globular boiler, the boiler including water inlet means disposed adjacent the upper portion of the globular boiler, an upwardly directed steam outlet conduit originating from the uppermost portion of the globular boiler, and a refractor lens window disposed within an upper portion of the globular boiler, the boiler being adapted to contain a body of water; (b) controllable means comprising a paraboloid reflector mounted on a post for directing the sun's rays towards the refractor lens window to generate heat to boil water in the globular boiler; (c) a primary steam-powered turbine for the generation of electricity, the turbine being disposed at a level above that of the globular boiler, the primary steam-powered turbine being connected to the steam outlet conduit and thus being driven by steam under pressure from the globular boiler; (d) steam condenser means comprising a radiator connected to the outlet from the primary steam-powered turbine for simultaneously recovering useful heat from the steam and for partially condensing the steam to a mixture of steam and water, and a condenser connected to the outlet from the radiator for substantially completely condensing the steam to substantially pure water; (e) a closed reservoir connected to an outlet from the condenser, the reservoir being disposed at a level lower than the level of the primary steam-powered turbine but at a level higher than the level of the globular boiler, the reservoir being for receiving and storing the substantially pure water from the condenser; (f) a secondary, water-powered turbine for the generation of electricity, that turbine being disposed at a level lower than that of the reservoir but higher than that of the globular boiler, and being connected to the reservoir, that secondary, water-powered turbine being selectively driven by water from the reservoir; (g) a valve automatically sequenced for periodic opening, to permit flow of water from the reservoir to the secondary turbine to drive that turbine, and for periodic closing to cut-off the flow of water, to permit that secondary turbine to remain at rest; (h) effluent means from the secondary turbine to conduct pure water to an inlet to the globular boiler, the inlet being disposed at an upper portion of the globular boiler; and (i) a check valve in the effluent means (h) to control the recirculating flow of water back to the globular boiler water from the reservoir to the secondary turbine, and for periodic closing, thereby to cut off such water flow.

By yet another variant, the solar power generator includes a check valve to control the flow of water through the pure water effluent means back to the hollow globular boiler.

By a still further variant, the means (b) comprises a paraboloid reflector mounted on a post.

In the accompanying drawings, the single FIGURE is a schematic drawing of a solar power generator of one aspect of this invention as a system for the conservation of water used in such an electrical power generating plant.

The embodiment of the invention illustrated is applicable wherever sunlight reaches and wherever water is available.

DESCRIPTION OF PREFERRED EMBODIMENTS

General Description

Generally, this solar power generator is a sealed, closed loop system including a ray collector which collects the rays of the sun, partially converge them and refracts them through a refractor lens which completes the convergence and yields high temperatures, which vaporizes the water in the globular boiler and produces steam that drives the day generator. The steam is then conducted through the radiator where most of its sensible heat will be released, then to the condenser where the remainder of the sensible heat and its latent heat will dissipate and the vapor will condense. The condensate will accumulate in the reservoir. This water will be pure distilled water. It will be released at night to drive the night generator, and then be returned to the globular boiler.

BRIEF DESCRIPTION OF THE DRAWING

The accompanying drawing is a schematic view of the closed loop sealed recirculatory water conservation solar generator of one embodiment of this invention.

DESCRIPTION OF THE FIGURE

As seen in the drawing, the heart of the invention is the fixed globular boiler 10. The globular boiler 10 comprises a hollow globular vessel 11. The level 14 of the water in vessel 11 is sufficient to provide steam for the system.

An upwardly directed steam outlet conduit 22 is enveloped with insulation 24 to minimize heat loss by radiation.

Steam outlet conduit 22 leads to primary generator 25, provided with a steam-run turbine blade 26 which turns shaft 27 for the generation of electricity in the usual manner. The outflow steam lines 28 from generator 25 comprise a radiator 29, provided with radiator fins 29a for the simultaneous partial condensation of steam or dissipation of heat from the steam lines 28. Radiator 29 can alternatively, although not shown, be a water cooled heat exchanger system, with the flow of the water being caused by a steam pump, using effluent steam from the generator 25. Radiator 29 leads to condenser 30, also provided with radiator fins 31, (or with a water cooled heat exchanger) where the condensation of the steam to water can be substantially completed. Effluent from the condenser 30 is to a reservoir 32. Original make-up water to the sealed system is supplied to reservoir 32 by lines 32a.

The reservoir 32 is adapted to release its contents through sluice 33, controlled by valve 34 which is automatically sequenced for periodic opening to permit flow of water from the reservoir 32 to drive the turbine 35, and for periodic closing to cut-off the flow of water, to permit that secondary turbine 35 to remain at rest. Thus, the water can be controlled to flow from the reservoir 32 through sluice 33 to a secondary generator 35 to run a water-powered turbine blade 36 which turns shaft 37 for the generation of electricity in the usual manner. The outflow of pure water from effluent line 38 is controlled through check valve 39 back to globular boiler 11.

The input of energy for the operation of the solar generator is by the mechanism of a paraboloid reflector 40 mounted on a post 41. By suitable control of reflector 40 rays 42 of the sun 43 are caused to impinge as a parallel stream into reflector lens 44. The rays concentrated by refractor 44 generate heat to cause the water in globular boiler 11 to boil.

OPERATION OF PREFERRED EMBODIMENT

Steam rising through steam outlet conduit 22 drives turbine 26 to generate electricity, is condensed to water in tubes 28 and condenser 30 and is stored in reservoir 32. Then it can perform additional useful work while flowing down through turbine 36 to generate more electricity. The effluent water is returned to the globular boiler 11 through recycle line 38, controlled in its flow by a check valve 39.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claim.

What I claim is:

1. A closed loop sealed recirculatory water conservation solar power generator comprising:

(a) a stationary hollow globular boiler, said boiler including water inlet means disposed adjacent said upper portion of said globular boiler, an upwardly directed steam outlet conduit originating from the uppermost portion of said globular boiler, and a refractor lens window disposed within an upper portion of said globular boiler, said boiler being adapted to contain a body of water;

(b) controllable means comprising a paraboloid reflector mounted on a post for directing the sun's rays towards said refractor lens window, thereby to generate heat to boil water in said globular boiler;

(c) a primary steam-powered turbine for the generation of electricity, said turbine being disposed at a level above that of said boiler, said primary steam-powered turbine being connected to said steam outlet conduit and thus being driven by steam under pressure from said globular boiler;

(d) steam condenser means comprising a radiator connected to the outlet from said primary steam-powered turbine for simultaneously recovering useful heat from said steam and for partially condensing said steam to a mixture of steam and water, and a condenser connected to the outlet from said radiator for substantially completely condensing said steam to substantially pure water;

(e) a closed reservoir connected to an outlet from said condenser, said reservoir being disposed at a level lower than the level of said primary steam-powered turbine but at a level higher than the level of said globular boiler, said reservoir being for receiving and storing said substantially pure water from said condenser;

(f) a secondary water-powered turbine for the generation of electricity, said turbine being disposed at a level lower than that of said reservoir but at a level higher than that of said globular boiler, said turbine being connected to said reservoir, said secondary, water-powered turbine and being selectively driven by water from said reservoir;

(g) a valve automatically sequenced for periodic opening, to permit flow of water from said reservoir to said secondary turbine to drive said turbine, for for periodic closing to cut-off said flow of water to permit said secondary turbine to remain at rest;

(h) effluent means from said secondary turbine to conduct pure water to an inlet to said globular boiler, said inlet being disposed at an upper portion of said globular boiler; and (i) a check valve in said effluent means (h) to control the recirculating flow of water back to said globular boiler.

* * * * *